United States Patent
Madan et al.

(10) Patent No.: US 11,954,533 B2
(45) Date of Patent: Apr. 9, 2024

(54) USING MACHINE LEARNING TECHNIQUES TO FLOW CONTROL CLIENTS IN A DEDUPLICATION FILE SYSTEM

(71) Applicant: EMC IP Holding Company LLC, Hopkinton, MA (US)

(72) Inventors: Nitin Madan, Cupertino, CA (US); Fani Jenkins, Boulder, CO (US); Gobikrishnan Sundharraj, Santa Clara, CA (US); Deepa Ramesh, Cupertino, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 545 days.

(21) Appl. No.: 17/233,418

(22) Filed: Apr. 16, 2021

(65) Prior Publication Data
US 2022/0334876 A1    Oct. 20, 2022

(51) Int. Cl.
*G06F 17/00* (2019.01)
*G06F 9/50* (2006.01)
*G06F 11/34* (2006.01)
*G06F 16/174* (2019.01)
*G06N 20/00* (2019.01)

(52) U.S. Cl.
CPC .......... *G06F 9/505* (2013.01); *G06F 11/3419* (2013.01); *G06F 16/1748* (2019.01); *G06N 20/00* (2019.01)

(58) Field of Classification Search
CPC .... G06F 9/505; G06F 9/5016; G06F 11/3419; G06F 11/3034; G06F 11/3433; G06F 11/3452; G06F 16/1748; G06F 2209/5019; G06F 2209/504; G06N 20/00
See application file for complete search history.

(56) References Cited

U.S. PATENT DOCUMENTS

| | | | |
|---|---|---|---|
| 8,239,589 B1* | 8/2012 | Certain | G06F 3/0673 |
| | | | 710/39 |
| 9,208,820 B2* | 12/2015 | Constantinescu | G06F 3/0682 |
| 10,740,295 B2* | 8/2020 | Vijayan | G06F 16/137 |
| 11,018,991 B1* | 5/2021 | Vishwakarma | H04L 47/823 |
| 11,481,261 B1* | 10/2022 | Frandzel | G06F 9/4881 |
| 2010/0332454 A1* | 12/2010 | Prahlad | H04L 67/5682 |
| | | | 707/696 |
| 2018/0150485 A1* | 5/2018 | Tripathy | G06F 16/1748 |

* cited by examiner

*Primary Examiner* — Greta L Robinson
(74) *Attorney, Agent, or Firm* — Staniford Tomita LLP

(57) ABSTRACT

Detecting a trend in latency for storage underlying a deduplicated file system includes generating a set of data points by recording when input/output (IO) requests were issued to the storage and recording time required to receive success responses from the storage. Least squares regression is performed on the data points to find a best-fit line through the data points. A slope of the best-fit line is calculated. A determination is made as to whether the slope is positive, a positive slope thereby indicating a trend of increasing latency of the storage. When the slope is determined to be positive, clients accessing the deduplicated file system are throttled.

18 Claims, 11 Drawing Sheets

Identify, during an intermediate time period of the sampling interval, IO requests issued by the file system to the underlying storage layer and, for each IO request, the time required to receive the success response from the underlying storage layer
810

Calculate an average time required to receive success responses for the IO requests
815

Generate, for the plot, an IO request data point as having a y-coordinate corresponding to the average time required to receive the success responses, and an x-coordinate corresponding to the intermediate time period
820

Select a next consecutive intermediate time period
825

Repeat average success response time calculation for each remaining intermediate time period within the sampling interval to generate a set of IO request data points for the plot
830

FIG. 8

Generate a notification, supported by a communication protocol used by a client, to inform the client that their request could not be processed within a threshold period of time and that the client should wait and retry the request with a new identifier (ID)
910

Transmit the notification to the client
915

USING MACHINE LEARNING TECHNIQUES TO FLOW CONTROL CLIENTS IN A DEDUPLICATION FILE SYSTEM

TECHNICAL FIELD

The present invention relates generally to information processing systems, and more particularly to file systems.

BACKGROUND

File systems organize data stored in a storage system into a logical format for access by clients and applications. A file system allows clients and applications to make requests for file operations such as write, read, copy, and so forth. A deduplicated file system is a type of file system that can reduce the amount of redundant data that is stored. In particular, if a particular piece of data is identified as a duplicate, the data is not again stored. Instead, a reference can be created pointing to the previously stored data. Having a deduplicated file system is especially desirable when supporting large data sets involving hundreds of millions of files occupying many thousands of terabytes.

A file system can be viewed as residing between the clients and underlying storage system. Occasionally, the underlying storage system may experience a degradation in performance. This can occur for any number of reasons. As an example, consider that storage is being provided by a cloud storage service. The cloud storage service may encounter a sudden spike in demand from other tenants or customers. The spike in demand may cause ripple effects throughout the infrastructure of the cloud host as the cloud host struggles to meet the demand.

The clients, being unaware of any issues, may continue to issue requests to the file system. The file system's resources are not unlimited. In a deduplicated file system, the file system must perform a number of operations to limit the amount of redundant data that is stored. The continued sending of requests from the clients coupled with the degradation in performance of the underlying storage system may cause the file system to unexpectedly shut down and lead to a disruption in service.

There is a need for improved systems and techniques in a deduplicated file system to control the flow of requests from clients to an underlying storage system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 8 shows a flow for collecting and generating data points for a least squares regression calculation, according to one or more embodiments.

DETAILED DESCRIPTION

Figure 1:
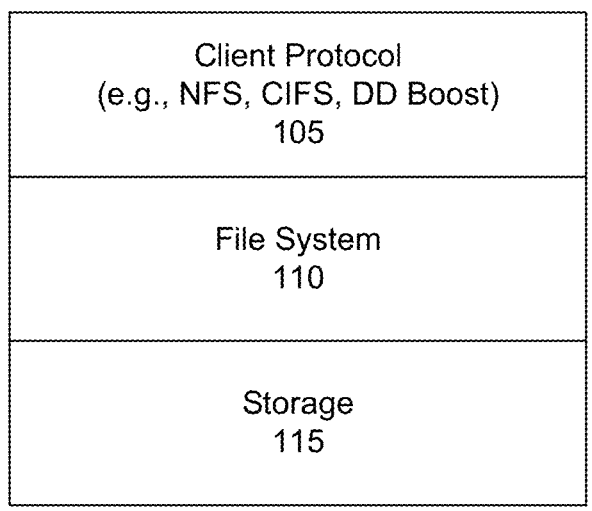
FIG. 1 shows a layer diagram of a protocol stack, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks shown in the figures may be functional and there can be many different hardware and software configurations to implement the functions described.

FIG. 1 shows a layer or stack diagram for handling client access requests. As shown in the example of FIG. 1, these layers include a client protocol 105, file system 110, and storage 115 underlying the file system. The file system is between the client protocol and storage layers. In order to access data stored in storage, the client generates a request. The client (or client application program) generating this request is said to reside at the top of what may be referred to as a protocol stack. The request is passed down to the file system and then down to the storage system. The storage system retrieves the requested data and the data begins its journey back up the protocol stack to the file system and ultimately to the requesting client. Each layer is responsible for a set of processing and packaging operations before handing off to a next layer.

In an embodiment, the storage is provided as cloud-based object storage service through a web service interface. Object storage is a computer data storage architecture that manages data as objects. Each object typically includes the data itself, a variable amount of metadata, and a globally unique identifier. Data may be written to and from an object store using web-based or Representational State Transfer (RESTful) protocols such as Hyper Text Transfer Protocol (HTTP). With cloud storage, an outside or third party service provider hosts an organization's data. The cloud provider procures, installs and maintains all hardware, software, and other supporting infrastructure in its data centers. Some examples of cloud-based object storage services include Amazon Web Services (AWS) Simple Storage Service (S3), by Amazon.com, Inc. of Seattle, Washington; Google Cloud Platform (GCP) by Alphabet, Inc. of Mountain View, California; Azure by Microsoft Corporation of Redmond, Washington; and others.

In another embodiment, the storage includes an on-premises data storage system. On-premises storage refers to storage hosted within the organization's infrastructure. For example, the storage system may be located physically onsite in the organization. The storage is controlled, administered, maintained, and procured by the organization and its in-house information technology (IT) team, or an IT partner. Data and other information may be shared between computers through the organization's local network. An example of an on-premises data storage system includes Data Domain as provided by Dell EMC of Hopkinton, Massachusetts Data Domain is a deduplication storage system that provides protection storage for backup, archive, and disaster recovery. Some embodiments are described in conjunction with the Data Domain product from Dell EMC. It should be appreciated, however, that aspects and principles of the systems and techniques described herein can be applied to other storage and file systems.

Storage may include a combination of cloud and on-premises storage systems. For example, the Data Domain system can be used to facilitate storing data to cloud storage. A portion of client data may be stored in cloud storage. Another portion of the client data may be stored in on-premises storage. An organization may use cloud storage for long-term retention of archive data, whereas frequently accessed or recently backed up data may be stored on-premises.

The file system allows clients and client applications to access data stored in the storage system using file system protocols. Some examples of file system protocols include Network File System (NFS), Common Internet File System (CIFS), DD Boost, and others. In an embodiment, the file system is a deduplicated distributed file system. The file system provides a way to organize data stored in the storage system and present that data to clients and applications in a logical format. That is, the file system organizes the data into files and folders into which the files may be stored. When a client or client application requests access to a file, the file system issues a file handle or other identifier for the file to the client. The client can use the file handle or other identifier in subsequent operations involving the file. A namespace of the file system provides a hierarchical organizational structure for identifying file system objects through a file path. A file can be identified by its path through a structure of folders and subfolders in the file system. A file system may hold many hundreds of thousands or even many millions of files across many different folders and subfolders and spanning thousands of terabytes.

A file system's performance is heavily dependent on the performance of the underlying storage subsystem. While the file system itself may include mechanisms for optimizations (e.g., caches, input/output (IO) coalescing, and so forth), the performance of the underlying storage is often the most important factor in this equation. At the other end, the applications using the file system can cause instability in the environment, by sending too many IO requests. A file system and its associated protocols may handle these situations using a sliding window protocol, allowing only "as many" outstanding IOs.

In a traditional file system environment, that used to be a tightly designed parameter. The number of outstanding IOs were very closely associated with underlying disk bandwidth.

In hyper-scaled environments, this is no longer the case. Hyper-scaled environments include storage systems in which data is stored in logical pools and accessible via the Internet through a cloud computing provider who manages and operates data storage as a service. The physical storage spans multiple servers, and the physical environment is typically owned and managed by a hosting company. Such designs are promoted as offering instant scalability. Nonetheless, in practice the underlying storage can sometimes have high latencies, and the latencies can change at any time (say Amazon Prime Day event as held by Amazon, Inc. —Prime Day is an event characterized by a number of sales and promotions exclusive to Amazon Prime subscribers). This is not to exclude the on-premises storage subsystems. Even in highly robust Redundant Array of Independent Disks (RAID) enabled systems, RAID failures can cause rebuilding, which can cause unusual latencies. However, the latencies are especially highly pronounced and very unpredictable in the hyper-scaled environments.

In an embodiment, systems and techniques are provided for a machine learning method for a file system running in these environments in which the file system can adapt to changing IO latency patterns, and throttle the clients and the outstanding IOs.

A file system may use a layered approach to handle requests from applications. Different layers are tasked with different functions as a coordinated pipeline to process the application requests. In addition to a fixed task, each layer operates with a hard-coded or tight capacity (representing the number of requests that the layer can handle) with little or no room for change. The biggest drawback here is that a delay in processing a request at one layer will affect not only the latency of that request, but also that of requests queued behind it.

Applications, meanwhile, have no way of detecting the build-up of requests in the file system; and will continue sending requests. When this happens, traditional file systems become overloaded and suffer from performance degradation or even cause system outage.

In an embodiment, systems and techniques are provided to prevent this queue build-up from affecting latencies by throttling requests whenever a delay or request build-up is detected in any layer. In this embodiment, the throttling is based on the underlying storage layer, which controls the performance characteristics of the file system. The queue build-up problem is addressed using intelligent throttling which scales with the load on the system.

Figure 2:
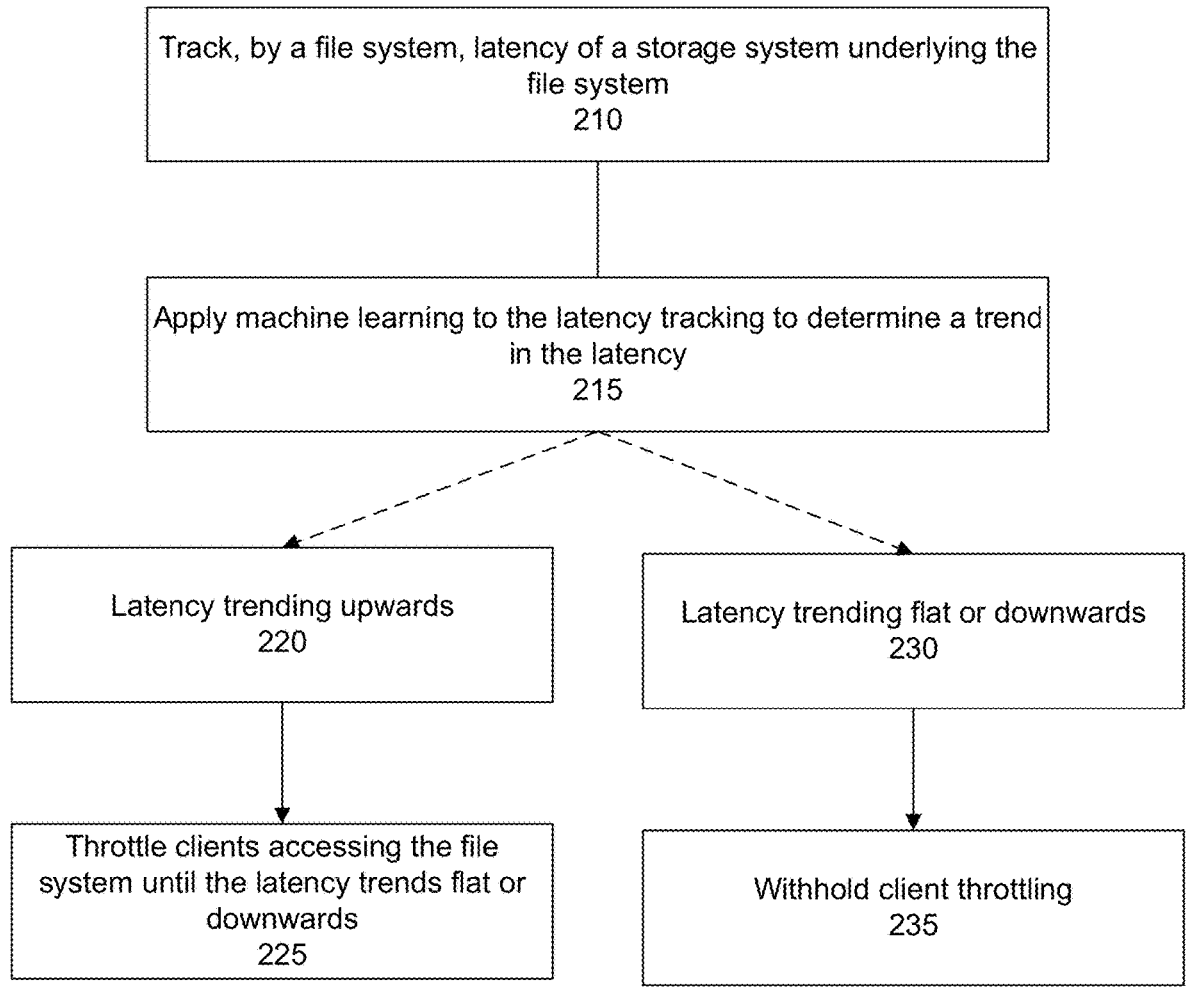
FIG. 2 shows an overall flow for controlling the flow of requests in a deduplicated file system from clients to an underlying storage system, according to one or more embodiments.

FIG. 2 shows an overall flow for intelligent throttling. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 210, a file system tracks latency of a storage system underlying the file system. In a step 215, machine learning is applied to the latency tracking to determine a trend in the latency. If the latency is trending upwards (step 220), clients accessing the file system are throttled until the latency trends flat or downwards (step 225). Alternatively, if the latency is trending flat or downwards (step 230), the client throttling is withheld (step 235).

Figure 3:
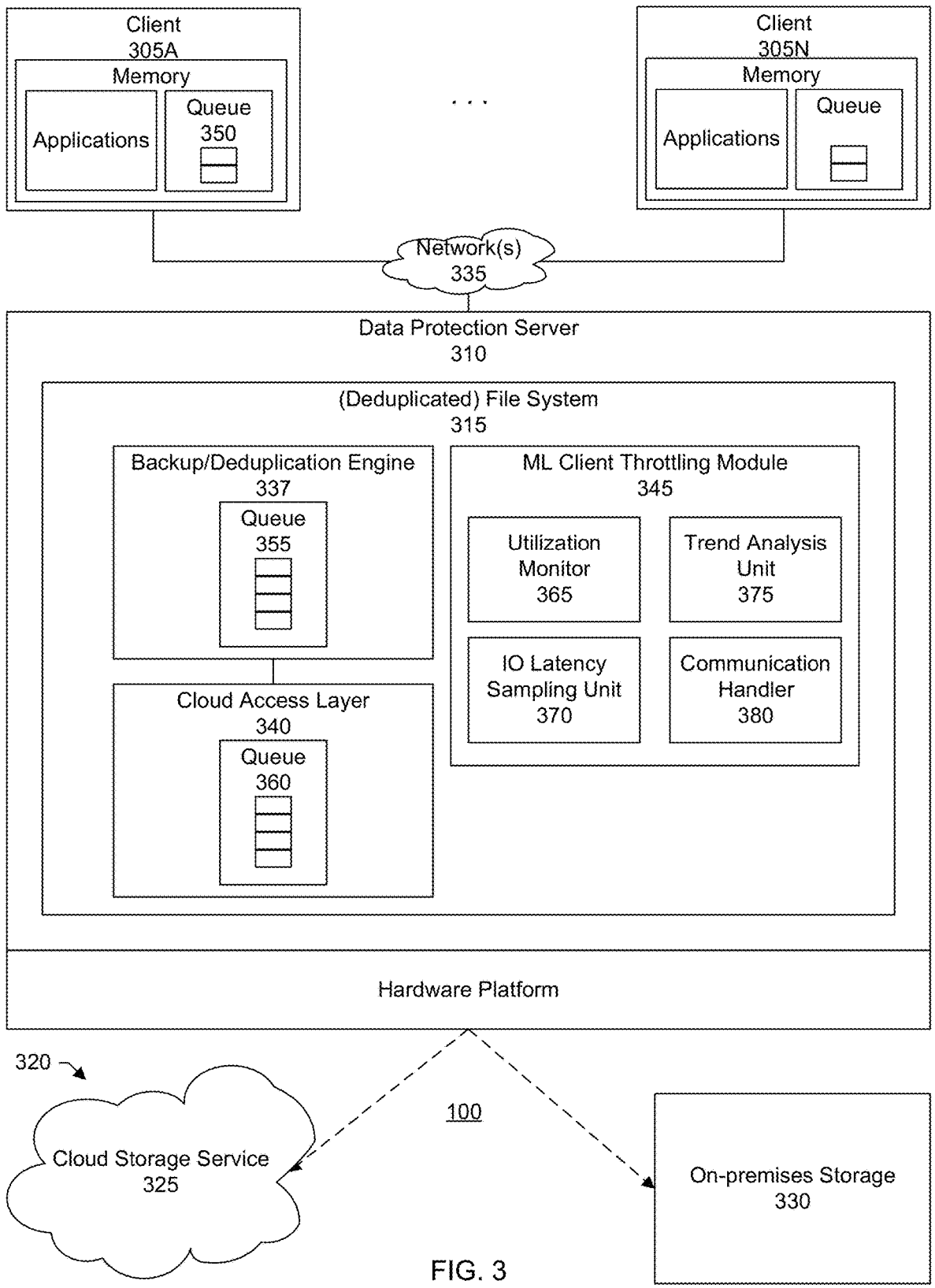
FIG. 3 shows a block diagram of an information processing system comprising a deduplicated file system having a client throttling module, according to one or more embodiments.

FIG. 3 shows further detail of a block diagram for the layer diagram shown in FIG. 1. In an embodiment, there is an information processing system 100 within which systems and techniques for using machine learning techniques to flow control clients in a deduplication file system are implemented. The example shown in FIG. 3 includes a set of clients 305A-N, a data protection server 310 having a file system 315, and underlying storage 320. The storage may include cloud-based object storage 325, on-premises storage 330, or both. The storage may represent a backup storage system. A network 335 interconnects the clients, data protection system with file system, and underlying storage system.

The clients include memory into which applications and other programs may be loaded. An example of an application includes a client backup module that coordinates with a backup application at the data protection server to backup client data to storage. The clients may include servers, desktop computers, laptops, tablets, smartphones, internet of things (IoT) devices, or combinations of these.

The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage may include object storage, cloud storage service, storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays. In an embodiment, the storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, the shared storage may represent logical storage that includes any number of physical storage devices connected to form a logical storage.

The data protection server is responsible for protecting client data such as via backup to storage 320. The file system of the data protection server includes a backup and deduplication engine 337, a cloud access layer (CAL) 340, and a machine learning (ML) client throttling module 345.

The file system supports network protocols for accessing remote centrally stored data. An example of such a protocol includes Network File System (NFS). NFS is a distributed file system protocol originally developed by Sun Microsystems in 1984. NFS is an open standard and allows a user on a client computer to access files over a computer network much like local storage is accessed. NFS allows the client computer to mount a remote file system as if it were a local file system. Thus, users—regardless of what workstation they may be using—can have access to their files in a centrally managed manner. Such file systems facilitate document and workspace sharing and data consistency as users on the network will be accessing the same set of files. Other examples of supported file system protocols allowing for remote access include Common Internet File System (CIFS), Server Message Block (SMB), and others.

Figure 4:
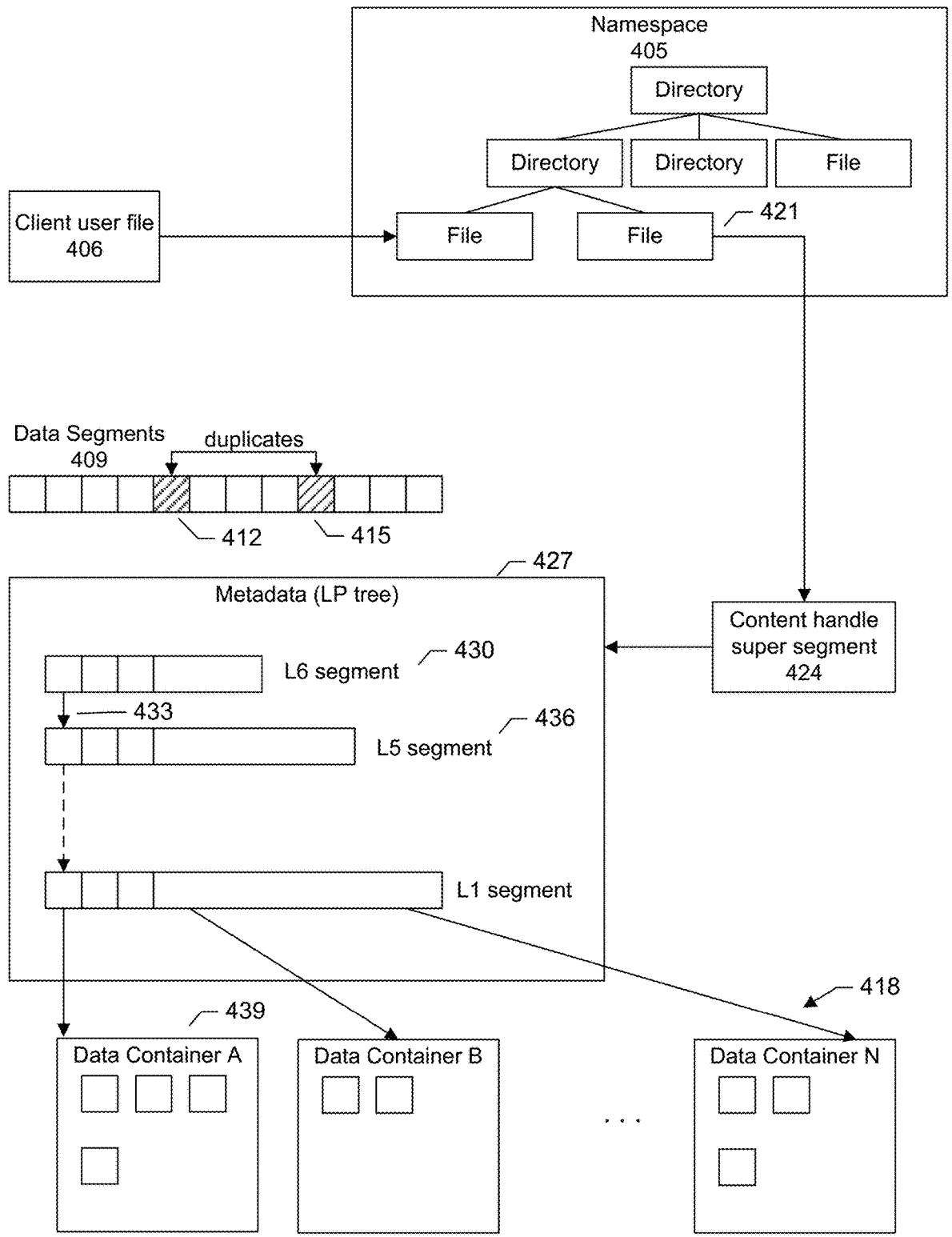
FIG. 4 shows an example of a deduplication process, according to one or more embodiments.

As discussed, in an embodiment, the file system is a deduplicated file system. An example of a deduplicated file system includes the Data Domain File System (DDFS) as provided by Dell EMC. In particular, as data (e.g., files) generated by the clients is transmitted over the network for storage the deduplication engine deduplicates the data prior to storage in order to reduce the amount of redundant data that is stored. FIG. 4 shows a block diagram illustrating a deduplication process of the file system according to one or more embodiments. As shown in the example of FIG. 4, the file system includes a namespace 405. Further details of a file system namespace are provided in FIG. 5 and the discussion accompanying FIG. 5. As data, such as a user file 406 (FIG. 4), enters the file system, it is segmented into data segments 409 and filtered against existing segments to remove duplicates (e.g., duplicate segments 412, 415). A segment that happens to be the same as another segment that is already stored in the file system may not be again stored. This helps to eliminate redundant data and conserve storage space. Metadata, however, is stored that allows the file system to reconstruct or reassemble the file using the already or previously stored segment.

Any unique data segments are then stored in fixed size immutable containers 418. A content handle 421 of the file is kept in the file system's namespace to support the directory hierarchy. The content handle points to a super segment 424 which holds a reference to a top of a segment tree 427 of the file. The super segment points to a top reference 430 that points 433 to metadata 436 and data segments 439.

In other words, in a specific embodiment, each file in the file system may be represented by a segment tree. The segment tree includes a set of segment levels arranged into a hierarchy (e.g., parent-child). Each upper level of the segment tree includes one or more pointers or references to a lower level of the segment tree. A last upper level of the segment tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

A segment tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes.

In other words, in an embodiment, every segment in the file system is identified by a 24 byte key (or the fingerprint of the segment), including the LP segments. Each LP segment contains references to lower level LP segments.

Figure 5:
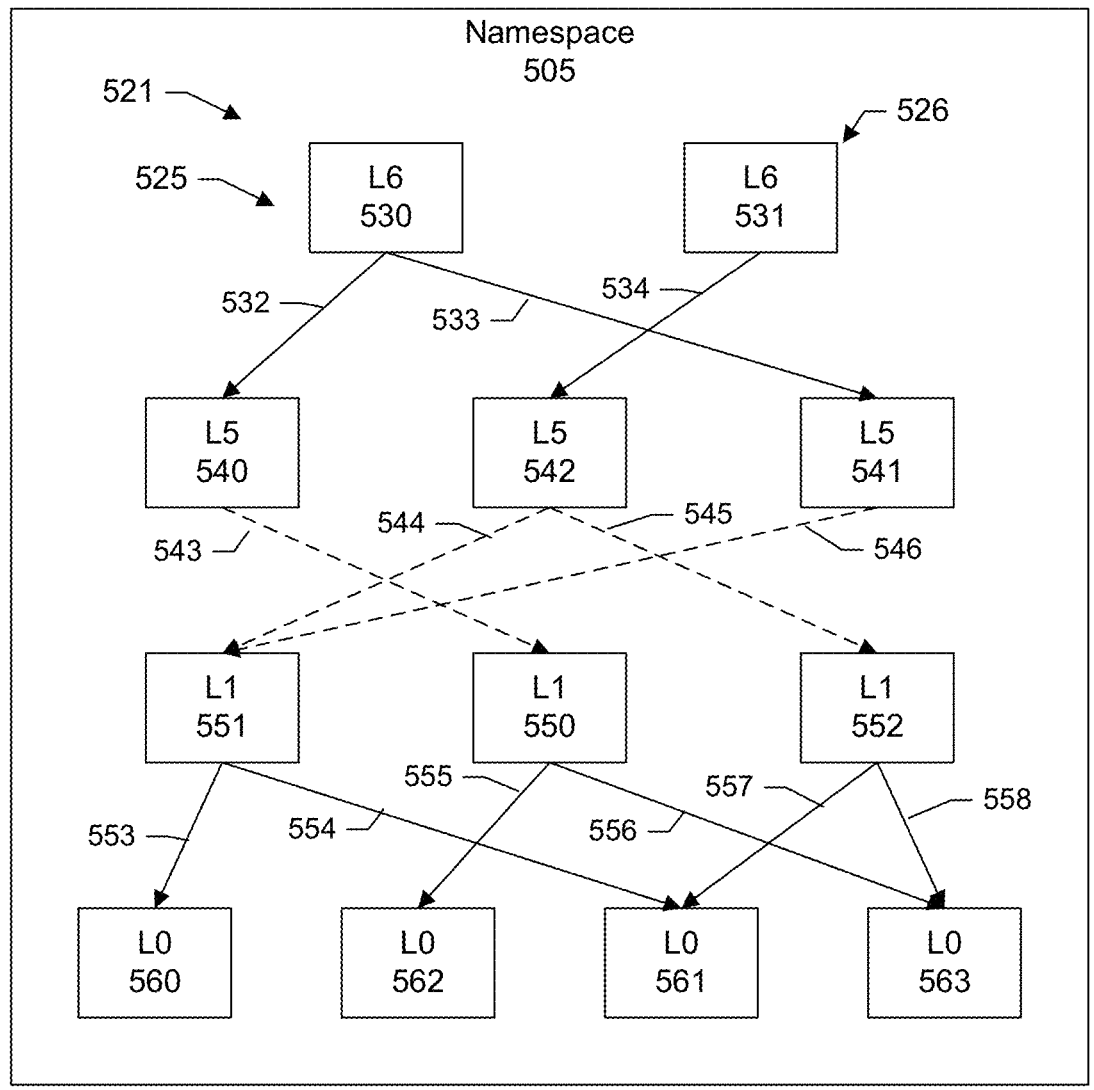
FIG. 5 shows an example of a namespace, according to one or more embodiments.

FIG. 5 shows further detail of a namespace 505 of the file system that may be used to organize the client data stored in the storage. Namespaces supporting file system protocols are much more complex than those for object storage service protocols. In particular, the namespace includes a set of segment trees 521 where each file in the file system is represented by a segment tree. A segment tree includes a set of segment levels arranged in a hierarchy. In a specific embodiment, a segment tree can have up to seven levels that may be labeled L6 to L0. For example, one or more intermediate levels may not be present for a relatively small file. A relatively small file may have, in addition to an L0 segment, just an L6 and L1 segment. A relatively large file may have, in addition to an L0 segment, an L6, L5, L4, L3, L2, and L1 segment.

Segments from L6 to L1 are upper level segments that store metadata (e.g., fingerprints) and may be referred to as LP segments. The lowest level segments are the L0 segments which represent actual data content of the file. An upper level segment references one or more lower level segments. Thus, an L6 segment includes an array of L5 references. An L5 segment includes an array of L4 references. An L4 segment includes an array of L3 references. An L3 segment includes an array of L2 references. An L2 segment includes an array of L1 references. An L1 segment includes an array of L0 references. In other words, lower level segments are referenced by higher level segments.

The example shown in FIG. 5 shows segment levels L6, L5, L1, and L0. Segment levels L4, L3, and L2 have been omitted for purposes of clarity. An L6 segment forms a root or parent. Thus, in the example shown in FIG. 5, there is a first segment tree 525 having an L6 segment 530 and representing a first file. There is a second segment tree 526 having an L6 segment 531 and representing a second file.

Two or more files may share a same segment. A lower level segment may be referenced by one or more upper level segments. For example, a lower level segment may be referenced by a first upper level segment, and a second upper level segment. The first upper level segment may be from a first segment tree representing a first file. The second upper level segment may be from a second segment tree representing a second file. An upper level segment may reference one or more lower level segments. For example, an upper level segment may reference a first lower level segment and a second lower level segment.

In the example shown in FIG. 5, L6 segment 530 references L5 segments 540, 541 as shown by arrows 532, 533 from L6 530 to L5 540, 541, respectively. L6 segment 531 references L5 segment 542 as shown by an arrow 534 from L6 531 to L5 542. L5 segment 540 references an L1 segment 550 as shown by an arrow 543 from L5 540 to L1 550. L5 segment 542 references L1 segments 551, 552 as shown by arrows 544, 545 from L5 542 to L1 551, 552, respectively. L5 segment 541 references L1 segment 551 as shown by an arrow 546 from L5 541 to L1 551. The arrows from the L5 to L1 segment level are shown in broken lines to indicate that there can be other intermediate levels between the L5 and L1 levels.

L1 segment 551 references L0 segments 560, 561 as shown by arrows 553, 554 from L1 551 to L0 560, 561, respectively. L1 segment 550 references L0 segments 562, 563 as shown by arrows 555, 556 from L1 550 to L0 562, 563, respectively. L1 segment 552 references L0 segments 561, 563 as shown by arrow 557, 558 from L1 552 to L0 561, 563, respectively.

In a specific embodiment, an upper level segment includes a fingerprint of fingerprints of one or more lower level segments referenced by the upper level segment. For example, L6 segment 530 includes a finger of fingerprints of L5 segments 540, 541. L6 segment 532 includes a fingerprint of fingerprint of L5 segment 542. L5 segment 540 includes a fingerprint of fingerprint of L1 segment 550. L5 segment 542 includes a fingerprint of fingerprints of L1 segments 551, 552, and so forth.

Referring back now to FIG. 3, the cloud access layer allows the file system to communicate with the underlying storage system. In an embodiment having a cloud-based object storage system, the cloud access layer translates the reads and writes the file system issues to cloud requests, such as PUT and GET. As an example, a block of data and/or metadata is written to cloud storage as an object.

The block diagram shown in FIG. 3 may be viewed as a stack having a set of layers. The process of generating a request, transmitting it over the network, and receiving a response is divided into layers. Specifically, to access the underlying storage layer, an application program running on the client generates an IO request for access. The request may be formatted according to a file system protocol such as NFS, CIFS, or other protocol. The request is passed over the network and handed down to the file system. The file system processes, translates, and packages the request into one or more cloud or other IO requests having a format recognized by the storage layer. The storage layer receives the requests issued by the file system. The storage layer carries out the requested operations and sends a response back up to the file system which, in turn, processes any data associated with the response and replies back up the stack to the requesting client application.

Each layer may include one or more queues. For example, there can be a queue 350 maintained at the client layer, a queue 355 maintained at the deduplication layer, and a queue 360 maintained at the cloud access layer. A queue is a type of data structure that provides for the temporary holding of data. A queue helps to facilitate overall performance by providing a buffer to handle the different rates in processing that each layer might have at any given time. Consider, as an example, that the client has sent multiple requests to write multiple files to the file system. As shown in the example of FIG. 4 and described in the accompanying discussion, the process of writing a file includes a deduplication process which, in turn, may involve generation and manipulation of metadata and references, namespace operations, fingerprint computations, fingerprint lookups, traverses of the file trees, determining locations at which data containers should be written, recording the locations and other metadata, and so forth. These tasks require time and compute to complete. If the file system is currently busy, rather than rejecting or blocking the client requests, the file system can place these tasks on a queue. The queue thus holds or temporarily stores various tasks that are to be performed by the file system.

Nonetheless, in some cases, one or more queues of the file system layer may not be able to absorb the delays in processing at the storage layer. When there is a delay at the storage layer, one or more queues in one or more layers above the storage layer may not be able to drain sufficiently quick to maintain overall system stability. In particular, the characteristics of the object storage infrastructure can be much more unpredictable than purpose-built block storage that serves as dedicated storage for the data protection server. For example, the object storage infrastructure can be shared by many end users which can cause a large amount of variation in the latencies of cloud operations. There can also be network latencies and cloud provider specific differences in response time. Cloud providers themselves may throttle the operations of the file system by replying with an HTTP response code 503 "Slow Down."

The cloud access layer is caught in the middle of this action. In particular, the cloud access layer may be receiving numerous requests coming from the upper layers of the file system stack, while at the same time being throttled by the cloud provider. In an embodiment, the cloud access layer can hold up to 128 containers in its write queue. This is a tunable value (cal_write_pool) which defaults to 128. When cloud latencies are high and/or operations are being retried frequently, the cloud access layer write queue can become full or reach capacity very quickly. At this point, the higher layers are blocked, and requests continue accumulating up the stack. Eventually, requests start to time out and the file system restarts causing service unavailability.

The throughput of the system is calculated a product of the number of outstanding requests, the number of requests that can be completed in a second and the size of each request. Consider, as an example, that there are 128 outstanding requests, and each takes 2 seconds to complete, and each being of size 1 megabyte (MB); then the throughput of the system is 64 megabytes per second (MB/s). If the latency of the system increases from 2 seconds to 4 seconds (per request) the throughput of the system would be 32 MB/s provided the number of outstanding requests is still 128. This implies, that if the number of outstanding IOs is near 100 percent (%) of the maximum outstanding IOs, the latency is a very good method to measure performance.

In an embodiment, each underlying subsystem or layer of the file system is equipped with resources which include memory buffers, queues, processing units, and other compute resources. These subsystems are architecturally layered in such a way which facilitates each subsystem to perform at its peak. When all the subsystems perform at their peak, the resources at each layer operate at the most optimal capacity, allowing for the maximum flow of data, all the way from the application to the underlying storage subsystem, achieving the best throughput.

In the hyper-scaled environments, the storage system is the object store. As a method of abstraction for the rest of the stack, the cloud access layer (CAL) subsystem communicates with the object store. The file system's performance is therefore, dependent on the CAL performance. Any increase in latencies in data exchange between CAL and the object store affects the overall throughput of the system negatively.

Applicants have appreciated that latency is a very good measure for performance, provided the number of outstanding IOs is very close to the max outstanding IOs. In an embodiment, latency is measured by associating a timestamp with each IO request issued by the file system (such as via the cloud access layer) and calculating the amount of time required to receive a success response from the object store.

Once the latencies are measured for several requests, a scatter plot of timestamps versus latencies and the corresponding best-fit line may be generated to compute whether the latency is increasing or decreasing over a period. When a determination is made that the latency is increasing, the clients are throttled, notified, or instructed to temporarily slow down, pause, or suspend their requests. While some lag may be experienced during throttling, the throttling helps to prevent or reduce the more serious impact of file system crash and service disruption.

In an embodiment, the throttling module includes a utilization monitor 365, IO latency sampling unit 370, trend analysis unit 375, and communication handler 380. The utilization monitor is responsible for monitoring resource utilization by the file system. Resource monitoring may include, for example, monitoring memory utilization and, in particular, the capacity of various file system queues, e.g., deduplication engine queue, cloud access layer queue, or both. When a capacity of one or more queues reaches a pre-configured threshold (e.g., is at 95 percent capacity), the utilization monitor instructs the IO latency unit to begin latency sampling of the underlying storage system in order to determine a trend in the latency. That is, in an embodiment, before initiating the trend detection, the utilization monitor monitors utilization of a queue of the file system holding tasks to be performed by the file system; and when a capacity of the queue reaches a threshold percentage, directs initiation of detecting the trend in latency of the underlying storage system.

To conduct the trend detection, the IO latency unit collects and measures latency times associated with IOs sent by the file system to the underlying storage. Latency refers to the amount of time required by the storage system to respond to an IO request. The collected latency data is processed into a set of data points. In an embodiment, a machine learning technique referred to as Least Squares Regression (LSR) is applied to the data points to obtain a best-fit line through the data points. An advantage of LSR includes its low compute costs. It should be appreciated, however, that other machine learning techniques may instead or additionally be applied.

The trend analysis unit examines the best-fit or LSR line to determine its slope. A positive slope indicates that latency of the storage system is increasing. Upon detecting that the latency trend is increasing, the communication handler begins client throttling operations or otherwise instructs or notifies the clients to temporarily slow down, pause, or suspend their requests. The throttling may continue until a determination is made that the latency trend is no longer increasing or is decreasing (e.g., zero or negative slope). The throttling module allows the file system to be automatically self-balancing and absorb changes in storage performance so as to ensure that the file system remains up and running. The trend analysis technique allows for making decisions without the need to rely on absolute numbers or user intervention. For example, during periods of throttling, a user may experience some slowness in application performance, but the file system will remain up. The application is made aware of performance issues in the lower layers of the stack and can thus moderate its access requests to the file system rather than simply disconnecting after a threshold number of timeouts have been reached.

Figure 6:
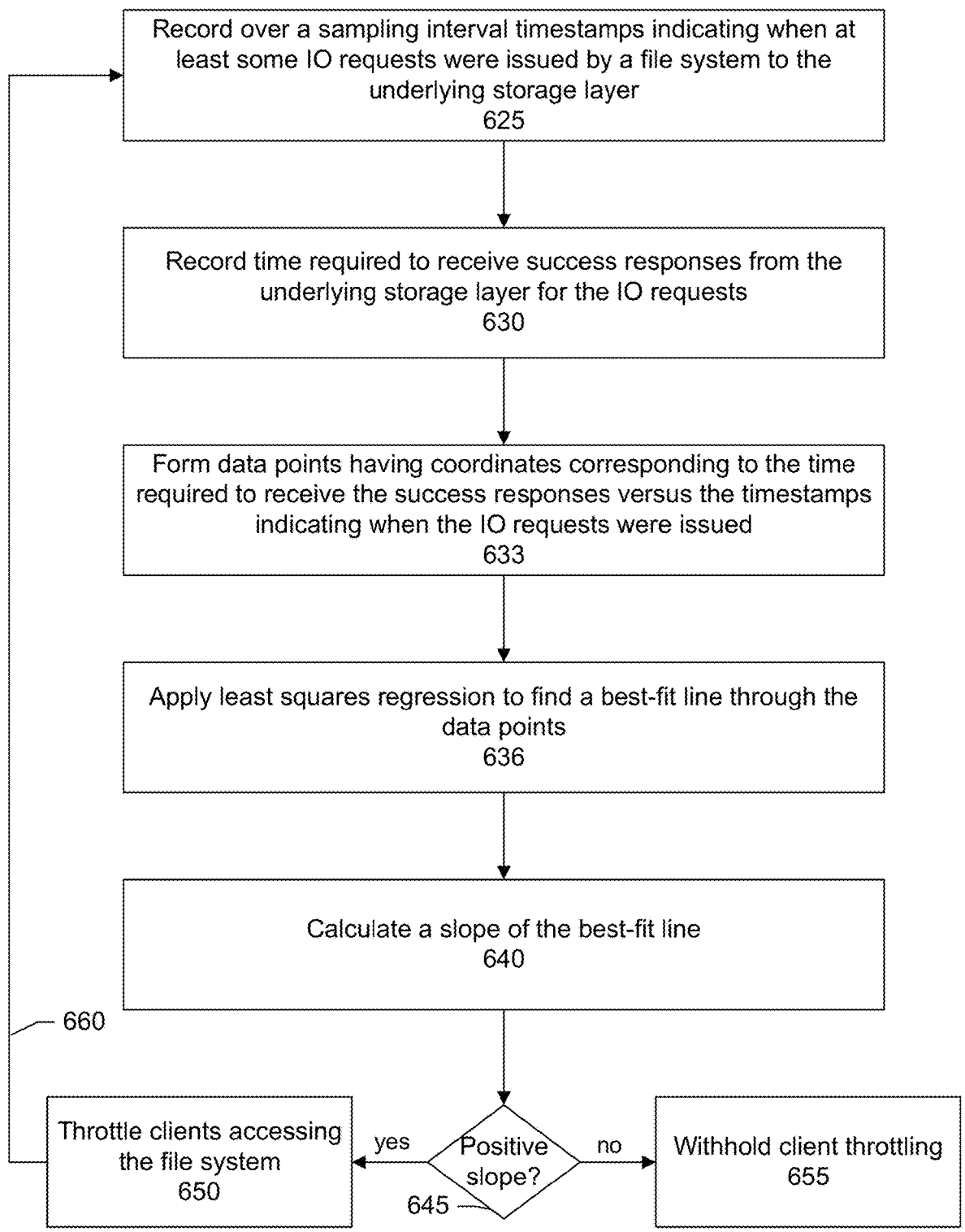
FIG. 6 shows a flow for throttling clients accessing a deduplicated file system, according to one or more embodiments.

FIG. 6 shows an overall flow for flow controlling clients. In an embodiment, a technique involves detecting or determining a trend in latency of the storage system underlying the file system. The detection includes generating a set of data points representing times required to receive success responses from the storage system for IO requests issued by the file system, performing a least squares regression on the data points to find a best-fit line through the data, and calculating a slope of the best-fit line. A positive slope indicates a trend of increasing latency in which the clients are then throttled.

In brief, in a step 625, timestamps indicating when at least some IO requests were issued by a file system to an underlying storage layer are recorded over a sampling interval. In a step 630, an amount of time required to receive success responses from the underlying storage for the IO requests are recorded.

In a step 633, data points are formed having coordinates corresponding to the time required to receive the success responses versus the timestamps indicating when the IO requests were issued. The IO requests may be plotted according to the time required to receive the success responses versus the timestamps indicating when the IO requests were issued.

In a step 636, least squares regression is applied to the data points to find a best-fit line through the data points. In a step 640, a slope of the best-fit line is calculated. In a step 645, a determination is made as to whether the slope is positive. As discussed, a positive slope indicates a trend of increasing latency. If a positive slope is detected, clients accessing the file system are throttled (step 650).

As shown by a loop 660, the throttling continues until a non-positive slope is detected (e.g., zero or negative slope), at which time the throttling is stopped or withheld (step 655). For example, a next or subsequent sampling interval may be selected and a latency trend of the storage system for the next sampling interval may be determined. The process of selecting a next sampling interval, detecting storage system latency, and throttling the clients when an increasing trend in latency is detected may be repeated multiple times until the latency no longer trends upwards (e.g., slope of best-fit line is zero or negative).

Figure 7:
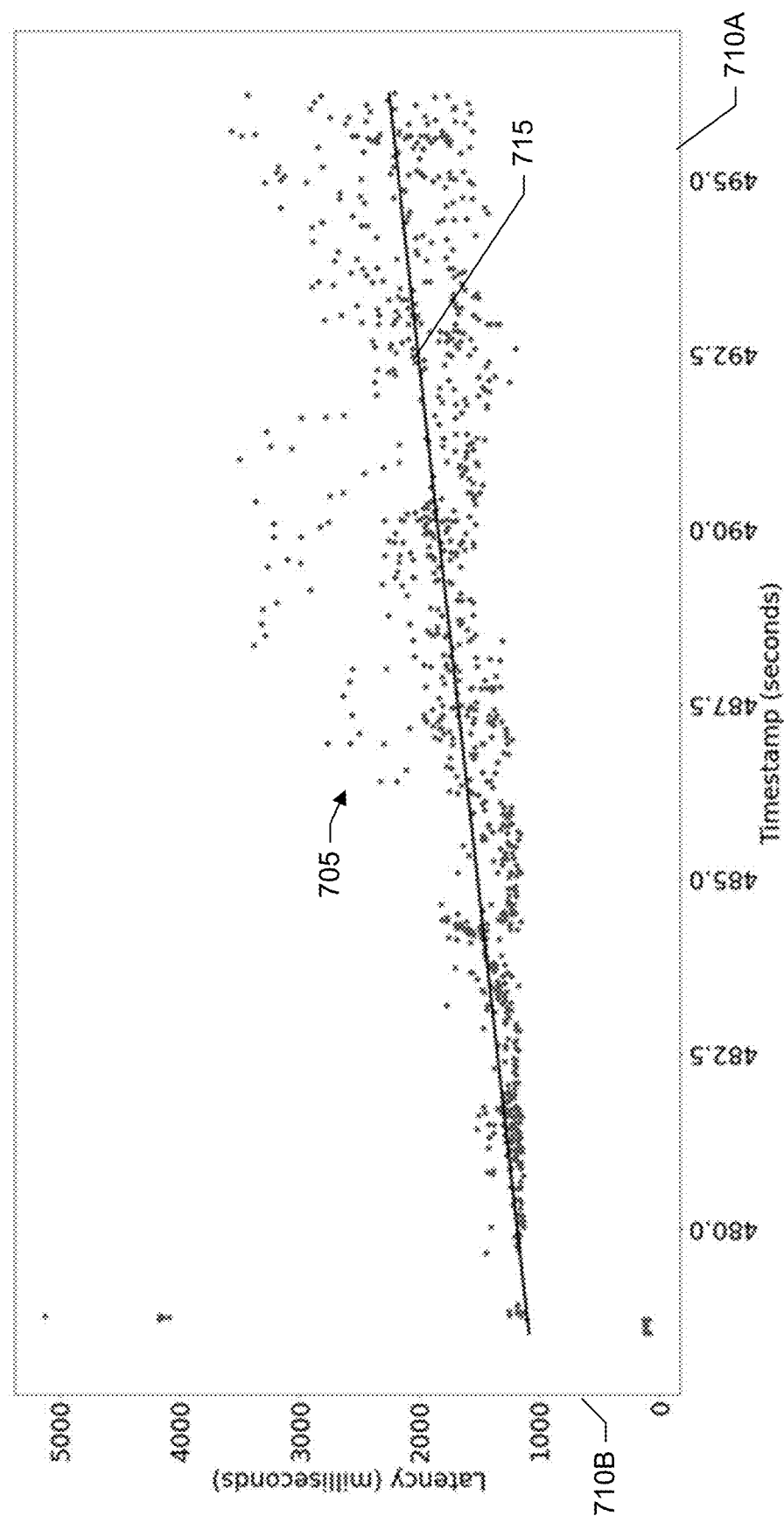
FIG. 7 shows a plot of a best-fit line based on a least squares regression calculation, according to one or more embodiments.

FIG. 7 shows a scatter graph plotting the IO requests as data points 705 according to the time required to receive the success responses from the underlying storage versus the timestamps indicating when the IO requests were issued. An x-axis 710A of the graph corresponds to the timestamps. A y-axis 710B of the graph corresponds to the latency.

As shown by the timestamps, the sampling interval was about 15 seconds, e.g., ranging from about 480.0 seconds to about 495.0 seconds. A duration of the sampling interval may be a configurable value. For example, the sampling interval may range from about 5 seconds to about 25 seconds. The sampling interval may be less than 5 seconds or greater than 25 seconds.

A line 715 through the data points indicates the best-fit or least squares regression line. The least squares regression line is the line that makes the vertical distance from the data points to the regression line as small as possible. In other words, this technique of drawing a best-fit line is referred to as the Least Squares Regression (LSR) method. The slope of the best-fit line is used to compute a trend. A positive slope means that the latencies are going up and vice versa.

Table A below shows the mathematical steps used to compute the slope of the least squares regression line.

TABLE A

| Step | Description |
|---|---|
| 1 | For each (x, y) point calculate $x^2$ and xy |
| 2 | Sum all x, y, $x^2$ and xy, which gives us $\Sigma x$, $\Sigma y$, $\Sigma x^2$, and $\Sigma xy$ |
| 3 | Calculate slope m: $$m = \frac{N\Sigma(xy) - \Sigma x \Sigma y}{N\Sigma(x^2) - (\Sigma x)^2},$$ where $N$ is the number of points |

The technique shown in table A above may be used to measure the past trend of the latencies. In an embodiment, the latency data is used along with other critical indicators of the system state in machine learning algorithms to predict future trends in latency. Some examples of indicators of system state include CPU saturation, device saturation, port saturation, buffer availability (e.g., ratio of available buffers to total buffers), and others.

Once a determination of the latency trend has been made, this knowledge may be used to throttle the client requests, to keep the system stable and healthy. This ensures that the latencies observed by the client requests is within acceptable limits.

FIG. 8 shows a flow for calculating averages for use in the scatter graph. Since the number of IOs to calculate the scatter graph can be enormous, in an embodiment, averages are calculated and used (e.g., one data point per second). These averages can be used to calculate the direction of the latency very efficiently. For example, if there are 30 such data points for the last 30 seconds, that can be used to figure out the direction of the latency slope.

More particularly, FIG. 8 shows a flow for generating IO request data points for the scatter graph using averages. In a step 810, during an intermediate time period of the sampling interval, an identification is made of IO requests issued by the file system to the underlying storage, and for each IO request, the time required to receive success responses from the underlying storage. Consider, as an example, a sampling interval having a duration of 15 seconds. The sampling interval may be divided into 15 intermediate time periods having a duration of 1 second. That is, the sampling interval may be divided into a set of intermediate time periods of equal duration. Table B below shows some sample data for IO requests issued during the intermediate time period.

TABLE B

| IO | Timestamp (seconds) | Latency (milliseconds) |
|---|---|---|
| 1 | 480.0 | 1001 |
| 2 | 480.1 | 1002 |
| 3 | 480.2 | 1008 |
| 4 | 480.3 | 1020 |
| 5 | 480.4 | 1002 |
| 6 | 480.5 | 1017 |
| 7 | 480.6 | 1005 |
| 8 | 480.7 | 1003 |
| 9 | 480.8 | 1007 |
| 10 | 480.9 | 1016 |

As shown in the example of table B above, a first IO issued from the file system and having a timestamp of 480.0 seconds required 1001 milliseconds to receive a response from the storage system; a second IO issued from the file system and having a timestamp of 480.1 seconds required 1002 milliseconds to receive a response from the storage system; a third IO issued from the file system and having a timestamp of 480.2 seconds required 1008 milliseconds to receive a response from the storage system; and so forth.

In a step 815, an average time to receive success responses for the IO requests during the intermediate time period is calculated. Thus, from the example shown in table B above, the average time to receive a success response is 1008 milliseconds ((1001+1002+1008+1020+1002+1017+1005+1003+1007+1016)/10=1008).

In a step 820, an IO request data point is generated for the plot. The IO request data point has a y-coordinate corresponding to the average time required to receive the success responses, and an x-coordinate corresponding to the intermediate time period. In other words, the intermediate time period within the sampling interval is paired with the average time required to receive the success responses during the intermediate time period to form an xy coordinate for the data point. Thus, from the example shown in table B above, a first IO request data point has a y-coordinate of 1008 milliseconds and an x-coordinate of 480 seconds that covers the intermediate time period within the sampling interval.

In a step 825, a next consecutive intermediate time period within the sampling interval is selected, e.g., 481 seconds. In a step 830, the average success response time calculation is repeated for each remaining intermediate time period within the sampling interval to generate a set of IO request data points for the plot.

Figures 9, 10:
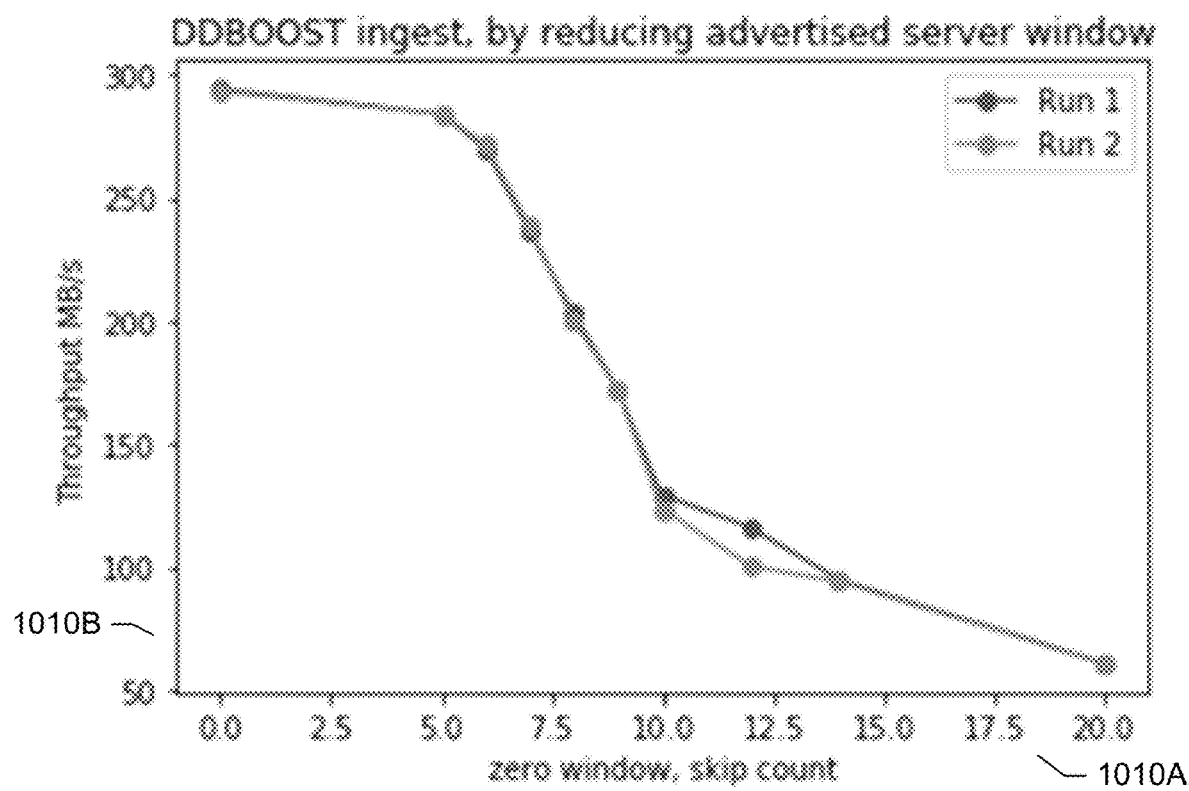
FIG. 9 shows a flow for throttling clients, according to one or more embodiments.
FIG. 10 shows a graph for reducing an advertised server window, according to one or more embodiments.

FIG. 9 shows a flow for throttling a client (step 650, FIG. 6) to limit or reduce the number of outstanding IOs. In a step 910, a notification, supported by a communication protocol used by a client, is generated to inform the client that their request could not be processed within a threshold period of time and that the client should wait and retry the request with a new identifier (ID). In a step 915, the file system transmits the notification to the client.

The technique shown in FIG. 9 allows the client to become a partner in the throttle negotiations. In the absence of such a technique, the clients may be unaware that the underlying storage is busy. As a result, the clients may continue making and sending IO requests to the file system which can lead to instability. Merely refusing requests when the stack is full does not provide for a good recovery. Merely stopping to accept requests when queues in the system reach a certain threshold has many drawbacks. For example, the transmission control protocol (TCP) buffers become full, if the server does not read from the sockets. This causes TCP to enter into congestion control and exponential back-off. TCP is a layer 4 network protocol and it does not know that the file system is busy. As a result, even when the file system reaches a healthy state, the TCP congestion control lags and takes a lot longer to recover. Further, using this method also means that even one bad player can affect all the clients connecting to the file system.

Similarly, merely accepting requests and delaying or not sending responses also has drawbacks. An extension to the technique above involves holding the responses. The basic premise with this approach is that most clients (protocols), have a notion of a sliding window of IO requests. They send out a limited number of outstanding requests. If that limit is exhausted, then the clients get throttled. This is somewhat more refined than the first approach. However, this also has some disadvantages. Specifically, since the request-responses are trapped in the outgoing queue, it leads to increased memory consumption in the file system. The other problem is that this approach assumes that the product of number of clients and their buffers is smaller than the maximum number of outstanding requests that the file system can support. If this assumption is not true, this method becomes like the first approach.

Most modern protocols such as NFSv3 and NFSv4 have a notion of delay and retry built as part of the Request for Comments (RFC). In an embodiment, systems and techniques leverage return or error codes provided by the protocol to let the client know that the file system server is too busy and the client should retry. In particular, NFSv3 and NFSv4 define NFS3ERR_JUKEBOX and NFS4ERR_DELAY respectively to mean "For any of a number of reasons, the server could not process this operation in what was deemed a reasonable time. The client should wait and then retry the request with a new RPC transaction ID". Similar to NFS, CIFS (and others) have their own version of request-retry mechanism that may be utilized to throttle the clients.

In another embodiment, propriety protocols are extended to in order to notify the clients that the file system is busy. For example, DD Boost as provided by Dell EMC is a protocol that distributes parts of the deduplication process to the backup server or application clients, enabling client-side deduplication for faster, more efficient backup and recovery. A data storage deployment may use any combination of different communication protocols to store and access data. In an embodiment, the DD BOOST server receives fingerprints from the DD BOOST clients. These fingerprints are received in a server memory pool. The size of the pool defines the number of fingerprints that can be received. The available space in this pool is advertised as available capacity to the client.

The DD BOOST server can control throttling at a fine grained level, since the advertised capacity is a per stream (file) limit. An embodiment of the throttling technique with the DD BOOST protocol includes advertising zero capacity in the server pool, when it is determined that the clients need to be throttled. This provides for the client throttle and the client will wait for a non-zero capacity to be advertised by the server.

In an embodiment, a technique involves advertising a zero window for n times, before advertising the actual window. As the value of n goes up, the number of times a zero window is advertised goes up, thereby effectively throttling the client. As an example, consider a graph as shown in FIG. 10. An x-axis 1010A is n—the number of times a zero window is advertised, before an actual window is advertised. A y-axis 1010B is the throughput. As the value of n is increased, the throttle is almost linear. This technique may be extended to public protocols such as NFSv4's NFS4ERR_DELAY or NFSv3's NFS3ERR_JUKEBOX where the client will be requested to resend the data, because the server is requesting throttle.

As discussed, in an embodiment, systems and techniques measure and track the latencies and outstanding pool utilization for the IOs. Using this data, linear regression (or another machine learning method) is applied to determine if the latencies are going up or down. The direction of the latency slope is used to determine the throttle. For example, if the latencies are increasing, the clients may be throttled and vice versa. Since the client is a partner in this throttling method, the client can act appropriately, and the file system stack does not become unstable because it has too many IOs waiting to be flushed. In an embodiment, there is a machine learning method to determine increasing latencies. In an embodiment, a machine learning method throttles the client to maintain quality of service (QoS) in a deduplication file system.

In an embodiment, there is a method comprising: monitoring resource utilization in a deduplicated file system; detecting that utilization of a file system resource has reached a threshold level; upon the detection, tracking, over a sampling interval, latencies of IO requests issued by the file system to storage underlying the file system; representing the IO requests as data points on a plot of the latencies versus times indicating when the IO requests were issued; finding a line of best fit through the data points using least squares regression; finding a slope of the line; determining if the slope is positive; if the slope is determined to be positive, throttling clients accessing the deduplicated file system; and if the slope is not positive, not throttling the clients. In an embodiment, the file system resource includes a memory pool of the file system.

In an embodiment, there is a method comprising: detecting a trend in latency for storage underlying a deduplicated file system comprising: generating a plurality of data points by recording over a sampling interval timestamps indicating when input/output (IO) requests were issued by the deduplicated file system to the storage, and recording time required to receive success responses from the storage; performing a least squares regression on the plurality of data points to find a best-fit line through the data points; calculating a slope of the best-fit line; and determining whether the slope is positive, a positive slope thereby indicating a trend of increasing latency of the storage; and when the slope is determined to be positive, throttling clients that are accessing the deduplicated file system.

Generating a plurality of data points may include dividing the sampling interval into a plurality of intermediate time periods of equal duration; identifying IO requests issued by the deduplicated file system to the storage during an intermediate time period, and, for each IO request, time required to receive the success responses from the storage; calculating an average time to receive the success responses for the IO requests issued during the intermediate time period; and pairing the intermediate time period with the average time required to receive the success responses for the IO requests issued during the intermediate time period of the sampling interval to form an xy-coordinate of a data point.

The throttling may include generating a notification supported by a communication protocol used by the clients to inform the clients that their requests could not be processed and that the clients should wait and retry; and transmitting the notification to the clients. The throttling may include advertising to the clients a memory pool of the deduplicated file system as having zero capacity. In an embodiment, the method includes continuing the throttling of the clients until the slope of the best-fit line is determined to be zero or negative.

In an embodiment, the method includes before the detecting a trend in latency for the storage, monitoring utilization of a queue of the deduplicated file system holding tasks to be performed by the deduplicated file system; and when a capacity of the queue reaches a threshold percentage, initiating detection of the trend in latency for the storage.

In another embodiment, there is a system comprising: a processor; and memory configured to store one or more sequences of instructions which, when executed by the processor, cause the processor to carry out the steps of: detecting a trend in latency for storage underlying a deduplicated file system comprising: generating a plurality of data points by recording over a sampling interval timestamps indicating when input/output (IO) requests were issued by the deduplicated file system to the storage, and recording time required to receive success responses from the storage; performing a least squares regression on the plurality of data points to find a best-fit line through the data points; calculating a slope of the best-fit line; and determining whether the slope is positive, a positive slope thereby indicating a trend of increasing latency of the storage; and when the slope is determined to be positive, throttling clients that are accessing the deduplicated file system.

In another embodiment, there is a computer program product, comprising a non-transitory computer-readable medium having a computer-readable program code embodied therein, the computer-readable program code adapted to be executed by one or more processors to implement a method comprising: detecting a trend in latency for storage underlying a deduplicated file system comprising: generating a plurality of data points by recording over a sampling interval timestamps indicating when input/output (IO) requests were issued by the deduplicated file system to the storage, and recording time required to receive success responses from the storage; performing a least squares regression on the plurality of data points to find a best-fit line through the data points; calculating a slope of the best-fit line; and determining whether the slope is positive, a positive slope thereby indicating a trend of increasing latency of the storage; and when the slope is determined to be positive, throttling clients that are accessing the deduplicated file system.

Figure 11:
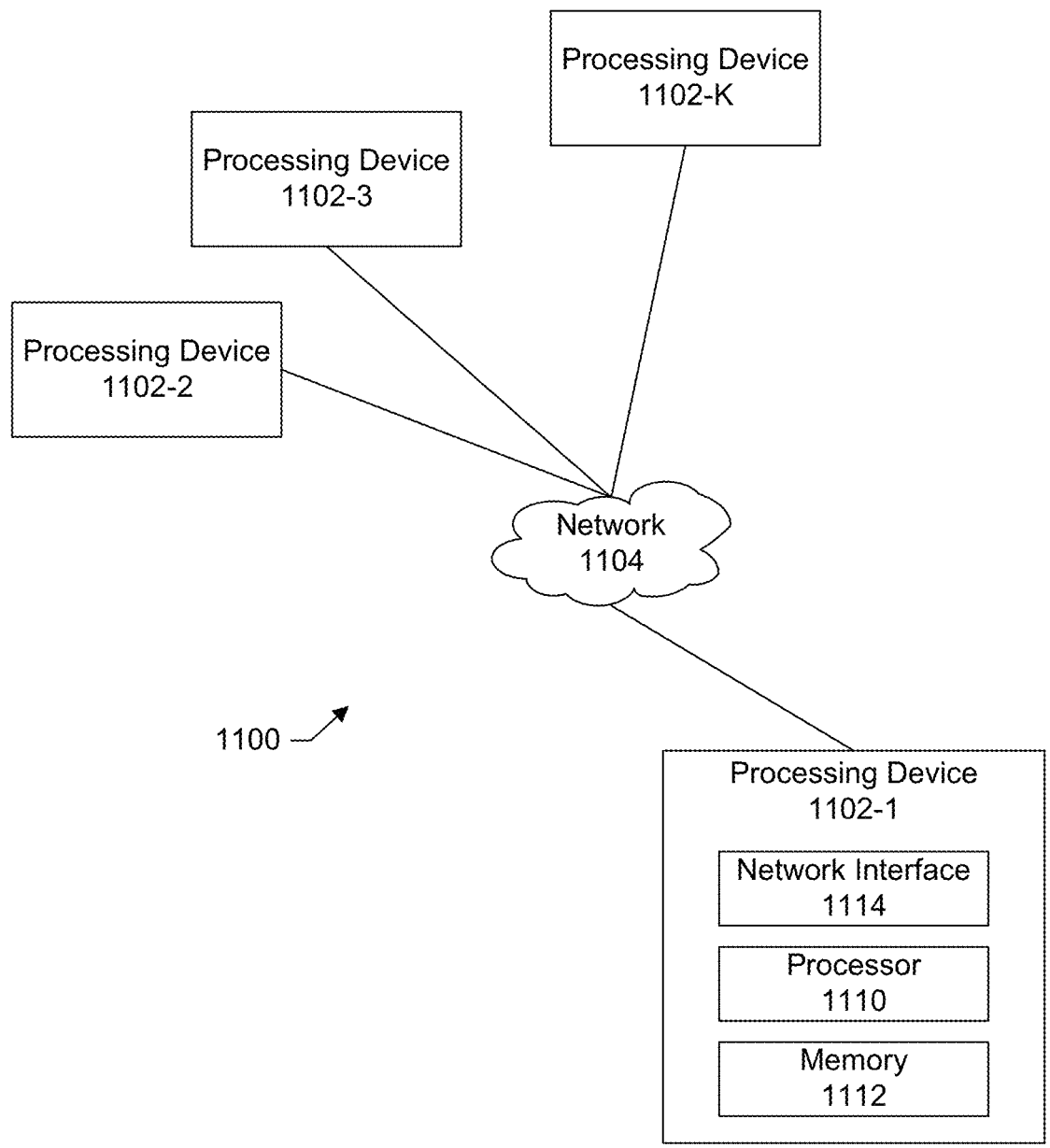
FIG. 11 shows a block diagram of a processing platform that may be utilized to implement at least a portion of an information processing system, according to one or more embodiments.

FIG. 11 shows an example of a processing platform 1100 that may include at least a portion of the information handling system shown in FIG. 3. The example shown in FIG. 11 includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA) or other type of processing circuitry, as well as portions or combinations of such circuitry elements.

The memory 1112 may comprise random access memory (RAM), read-only memory (ROM) or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1014, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 12:
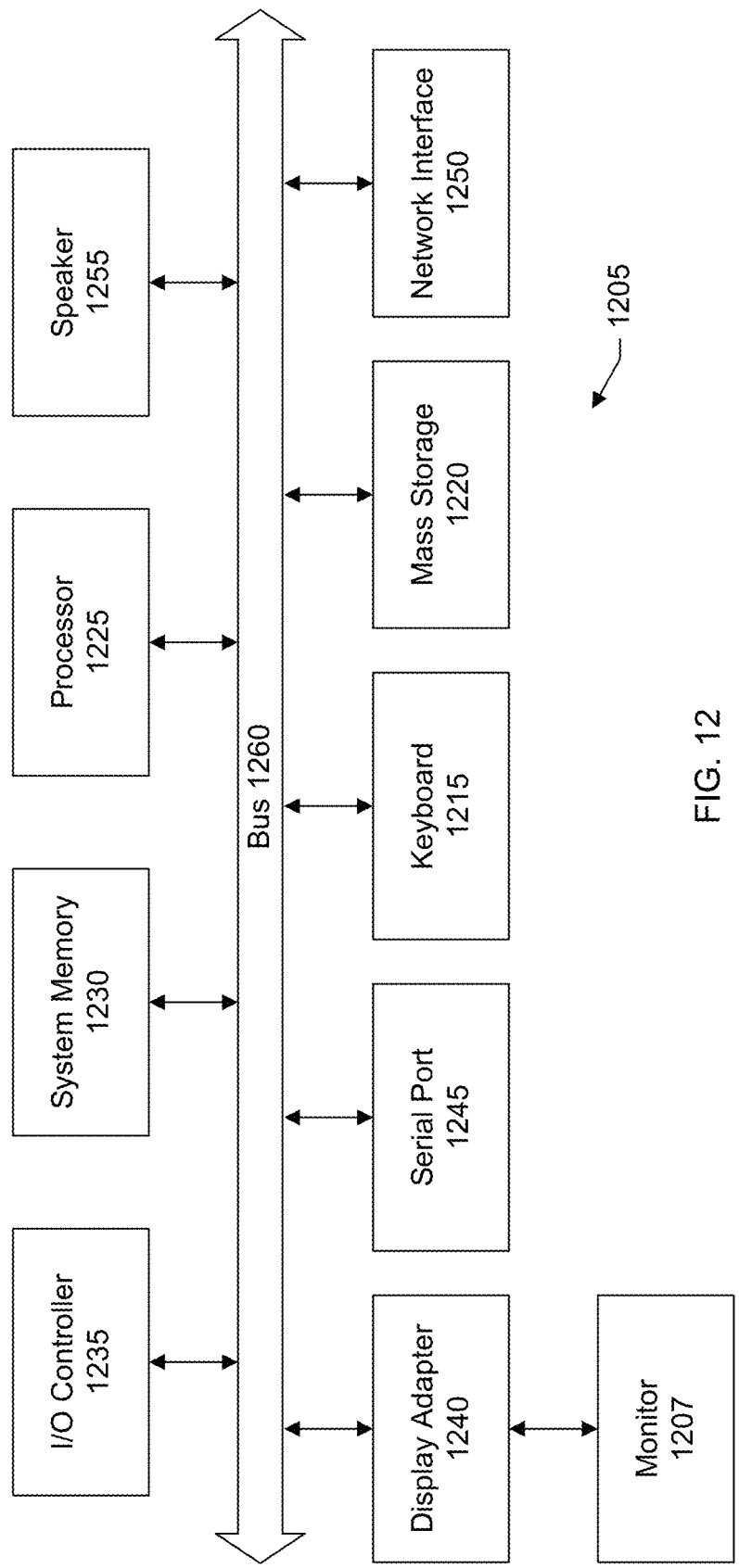
FIG. 12 shows a block diagram of a computer system suitable for use with the system, according to one or more embodiments.

FIG. 12 shows a system block diagram of a computer system 1205 used to execute the software of the present system described herein. The computer system includes a monitor 1207, keyboard 1215, and mass storage devices 1220. Computer system 1205 further includes subsystems such as central processor 1225, system memory 1230, input/output (I/O) controller 1235, display adapter 1240, serial or universal serial bus (USB) port 1245, network interface 1250, and speaker 1255. The system may also be used with computer systems with additional or fewer subsystems. For example, a computer system could include more than one processor 1225 (i.e., a multiprocessor system) or a system may include a cache memory.

Arrows such as 1260 represent the system bus architecture of computer system 1205. However, these arrows are illustrative of any interconnection scheme serving to link the subsystems. For example, speaker 1255 could be connected to the other subsystems through a port or have an internal direct connection to central processor 1225. The processor may include multiple processors or a multicore processor, which may permit parallel processing of information. Computer system 1205 shown in FIG. 12 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
    detecting a trend in latency for storage underlying a deduplicated file system comprising:
        generating a plurality of data points by recording over a sampling interval timestamps indicating when input/output (IO) requests were issued by the deduplicated file system to the storage, and recording time required to receive success responses from the storage;
        performing a least squares regression on the plurality of data points to find a best-fit line through the data points;
        calculating a slope of the best-fit line; and
        determining whether the slope is positive, a positive slope thereby indicating a trend of increasing latency of the storage; and
    when the slope is determined to be positive, throttling clients that are accessing the deduplicated file system.

2. The method of claim 1 wherein the generating a plurality of data points further comprises:
    dividing the sampling interval into a plurality of intermediate time periods of equal duration;
    identifying IO requests issued by the deduplicated file system to the storage during an intermediate time period, and, for each IO request, time required to receive the success responses from the storage;
    calculating an average time to receive the success responses for the IO requests issued during the intermediate time period; and
    pairing the intermediate time period with the average time required to receive the success responses for the IO requests issued during the intermediate time period of the sampling interval to form an xy-coordinate of a data point.

3. The method of claim 1 wherein the throttling comprises:
    generating a notification supported by a communication protocol used by the clients to inform the clients that their requests could not be processed and that the clients should wait and retry; and
    transmitting the notification to the clients.

4. The method of claim 1 wherein the throttling comprises:
    advertising to the clients a memory pool of the deduplicated file system as having zero capacity.

5. The method of claim 1 further comprising:
    continuing the throttling of the clients until the slope of the best-fit line is determined to be zero or negative.

6. The method of claim 1 further comprising:
    before the detecting a trend in latency for the storage, monitoring utilization of a queue of the deduplicated file system holding tasks to be performed by the deduplicated file system; and
    when a capacity of the queue reaches a threshold percentage, initiating detection of the trend in latency for the storage.

7. A system comprising: a processor; and memory configured to store one or more sequences of instructions which, when executed by the processor, cause the processor to carry out the steps of:
    detecting a trend in latency for storage underlying a deduplicated file system comprising:
        generating a plurality of data points by recording over a sampling interval timestamps indicating when input/output (IO) requests were issued by the deduplicated file system to the storage, and recording time required to receive success responses from the storage;
        performing a least squares regression on the plurality of data points to find a best-fit line through the data points;
        calculating a slope of the best-fit line; and
        determining whether the slope is positive, a positive slope thereby indicating a trend of increasing latency of the storage; and
    when the slope is determined to be positive, throttling clients that are accessing the deduplicated file system.

8. The system of claim 7 wherein the generating a plurality of data points further comprises:
    dividing the sampling interval into a plurality of intermediate time periods of equal duration;
    identifying IO requests issued by the deduplicated file system to the storage during an intermediate time period, and, for each IO request, time required to receive the success responses from the storage;
    calculating an average time to receive the success responses for the IO requests issued during the intermediate time period; and
    pairing the intermediate time period with the average time required to receive the success responses for the IO requests issued during the intermediate time period of the sampling interval to form an xy-coordinate of a data point.

9. The system of claim 7 wherein the throttling comprises:
generating a notification supported by a communication protocol used by the clients to inform the clients that their requests could not be processed and that the clients should wait and retry; and
transmitting the notification to the clients.

10. The system of claim 7 wherein the throttling comprises:
advertising to the clients a memory pool of the deduplicated file system as having zero capacity.

11. The system of claim 7 wherein the processor further carries out the step of:
continuing the throttling of the clients until the slope of the best-fit line is determined to be zero or negative.

12. The system of claim 7 wherein the processor further carries out the steps of:
before the detecting a trend in latency for the storage, monitoring utilization of a queue of the deduplicated file system holding tasks to be performed by the deduplicated file system; and
when a capacity of the queue reaches a threshold percentage, initiating detection of the trend in latency for the storage.

13. A computer program product, comprising a non-transitory computer-readable medium having a computer-readable program code embodied therein, the computer-readable program code adapted to be executed by one or more processors to implement a method comprising:
detecting a trend in latency for storage underlying a deduplicated file system comprising:
generating a plurality of data points by recording over a sampling interval timestamps indicating when input/output (IO) requests were issued by the deduplicated file system to the storage, and recording time required to receive success responses from the storage;
performing a least squares regression on the plurality of data points to find a best-fit line through the data points;
calculating a slope of the best-fit line; and
determining whether the slope is positive, a positive slope thereby indicating a trend of increasing latency of the storage; and
when the slope is determined to be positive, throttling clients that are accessing the deduplicated file system.

14. The computer program product of claim 13 wherein the generating a plurality of data points further comprises:
dividing the sampling interval into a plurality of intermediate time periods of equal duration;
identifying IO requests issued by the deduplicated file system to the storage during an intermediate time period, and, for each IO request, time required to receive the success responses from the storage;
calculating an average time to receive the success responses for the IO requests issued during the intermediate time period; and
pairing the intermediate time period with the average time required to receive the success responses for the IO requests issued during the intermediate time period of the sampling interval to form an xy-coordinate of a data point.

15. The computer program product of claim 13 wherein the throttling comprises:
generating a notification supported by a communication protocol used by the clients to inform the clients that their requests could not be processed and that the clients should wait and retry; and
transmitting the notification to the clients.

16. The computer program product of claim 13 wherein the throttling comprises:
advertising to the clients a memory pool of the deduplicated file system as having zero capacity.

17. The computer program product of claim 13 wherein the method further comprises:
continuing the throttling of the clients until the slope of the best-fit line is determined to be zero or negative.

18. The computer program product of claim 13 wherein the method further comprises:
before the detecting a trend in latency for the storage, monitoring utilization of a queue of the deduplicated file system holding tasks to be performed by the deduplicated file system; and
when a capacity of the queue reaches a threshold percentage, initiating detection of the trend in latency for the storage.

* * * * *